(12) United States Patent
Wong (10) Patent No.: US 9,516,975 B2
(45) Date of Patent: Dec. 13, 2016

(54) CONDIMENT MILL (71) Applicant: King's Flair Development Ltd., Hong Kong (HK)

(72) Inventor: Siu Wah Wong, Hong Kong (HK)

(73) Assignee: KING'S FLAIR DEVELOPMENT LTD., Hong Kong (HK)

( * ) Notice: Subject to any disclaimer, the term of this patent is extended or adjusted under 35 U.S.C. 154(b) by 334 days.

(21) Appl. No.: 14/256,196

(22) Filed: Apr. 18, 2014

(65) Prior Publication Data

US 2015/0297033 A1 Oct. 22, 2015

(51) Int. Cl.
*A47J 42/04* (2006.01)
*A47J 42/46* (2006.01)
*A47J 42/08* (2006.01)
*A47J 42/50* (2006.01)

(52) U.S. Cl.
CPC .............. *A47J 42/46* (2013.01); *A47J 42/04* (2013.01); *A47J 42/08* (2013.01); *A47J 42/50* (2013.01)

(58) Field of Classification Search
CPC ............. A47J 42/46; A47J 42/08; A47J 42/04
USPC .......................................................... 241/169.1
See application file for complete search history.

(56) References Cited

U.S. PATENT DOCUMENTS

| 4,844,352 | A | * | 7/1989 | Griffin | .................... | A47J 42/46 241/101.2 |
| 5,088,652 | A | * | 2/1992 | Chen | ....................... | A47J 42/46 241/169.1 |
| 7,637,447 | B2 | * | 12/2009 | Tang | ....................... | A47J 42/46 241/169.1 |
| 7,975,946 | B2 | * | 7/2011 | Bodum | .................... | A47J 42/04 241/101.3 |
| 7,988,081 | B2 | * | 8/2011 | Robbins | ................... | A47J 42/08 241/101.2 |
| 9,261,168 | B2 | * | 2/2016 | Yang | ........................ | F16H 3/34 |

* cited by examiner

*Primary Examiner* — Mark Rosenbaum
(74) *Attorney, Agent, or Firm* — Nyemaster Goode P.C.

(57) ABSTRACT

The present invention relates to a condiment mill capable of separately accommodating and grinding two condiments depending on the axial position of the means for driving the grinding mechanisms of the two condiments and independent of the direction of the rotation of the cover part. The condiment mill of the present invention also comprises an indicator mechanism to clearly indicate which one of the condiments is being ground.

20 Claims, 12 Drawing Sheets

CONDIMENT MILL

TECHNICAL FIELD OF THE INVENTION

This invention relates generally to a condiment mill, and particularly, to a condiment mill that accommodates and grinds two condiments separately depending on the axial position of the means for driving the grinding mechanism of the two condiments.

BACKGROUND OF THE INVENTION

Condiment mills that can separately accommodate and grind two different condiments, for example, salt and pepper, are currently available. These condiment mills typically comprise two parallel containers separated from each other. At the bottom of each of the containers, a grinding mechanism is provided for grinding the respective condiment. Each of the grinding mechanisms is driven by a respective shaft extending upwardly through the respective container. Both shafts are drivingly connected to a gear mechanism provided on top of the containers. The gear mechanism is configured in such a manner that when the gear mechanism is rotated in one direction, one of the shafts is driven in rotation, and consequently the respective grinding mechanisms is driven to grind and dispense the respective one of the condiments, and when the gear mechanism is rotated in another direction, the other one of the shafts is driven in rotation, and consequently the respective other grinding mechanism is driven to grind and dispense the other condiment.

This kind of condiment mills have the drawback that the gear mechanism needs to be rotated in different directions for different condiments. This operation mode requires the user to remember to rotate the gear mechanism in the correct direction in order to obtain the needed condiment, which increases the chances of misoperation. Furthermore, users may prefer to always rotate the gear mechanism in one direction, no matter which condiment they want to grind. Therefore, there is a need for a condiment mill that is able to separately accommodate and grind two different condiments, which allows the user to rotate the gear mechanism in any direction for either one of the condiments. Such a condiment mill may comprise a different mechanism to switch between the two condiments, unlike the prior art wherein the different rotation directions of the gear mechanism correspond to the different condiments.

SUMMARY OF THE INVENTION

The present invention has a principle object of providing a condiment mill which accommodates two condiments separately, and grinds any one of the condiments when a cover part of the mill is rotated. More particularly, the present invention aims to provide a condiment mill which can be conveniently switched between the two condiments for grinding operation by pressing a button provided on the condiment mill. The selection of condiment being ground is independent of the direction of the rotation of the cover part. Furthermore, the present invention aims to, provide a condiment mill which comprises an indicator mechanism to clearly indicate which one of the condiments is being ground.

These and other objects are satisfied by the present invention, which provides a condiment mill comprising:
a body part comprising a top end portion, first and second compartments below the top end portion and having respective bottom end portions, and a vertical divider wall between the compartments, each of said compartments for containing a separate condiment to be ground;
first and second grinding mechanism arranged in the bottom end portions of the first and second compartments respectively;
first and second gear mechanism drivingly connected to the first and second grinding mechanism respectively and arranged in the top end portion of the body part;
a cover part detachably and rotatably placed over a top of the body part;
a gear driving member movable between a first switch position wherein the gear driving member engages with the first gear mechanism and rotates to drive the first gear mechanism which, in turn, activates the first grinding mechanism, and a second switch position wherein the gear driving member engages with the second gear mechanism and rotates to drive the second gear mechanism which, in turn, activates the second grinding mechanism; the gear driving member being configured such that rotation of the cover part causes the rotation of the gear driving member in the first and second switch position; and
an actuator in operative connection with the gear driving member to move the gear driving member between the first switch position and the second switch position.

In a preferred embodiment of the present invention, the first gear mechanism may comprise a first gear wheel engagable with the gear driving member in the first switch position thereof, and a third gear wheel meshing with the first gear wheel and drivingly connected to the first grinding mechanism via a first shaft; and the second gear mechanism comprises a second gear wheel engagable with the gear driving member in the second switch position thereof, and a fourth gear wheel meshing with the second gear wheel and drivingly connected to the second grinding mechanism via a second shaft.

Preferably, the gear driving member may be configured as a rod, and each of the first and second gear wheel is formed with at least two opposite notches on an inner surface thereof, which notches are engagable with two protrusions projecting from two opposite sides of the gear driving member.

In a preferred embodiment of the present invention, the actuator may be configured as a ballpoint pen ratchet mechanism which is alternately latched in a first locked position or a second locked position, so that the first or the second locked position of the ballpoint pen ratchet mechanism is respectively correspondent to the first or the second switch position of the gear driving member.

The ballpoint pen ratchet mechanism may comprise a push plunger and a ratchet. The push plunger may be connected to a first spring which is forced to move the push plunger upward. The ratchet may be configured to rotate when the push plunger is pressed against the ratchet, the ratchet being connected to a second spring which is forced to move the ratchet upward and connected to the gear driving member. The push plunger and the ratchet may be disposed inside a cover casing of the cover part in such a way that the rotation of the ratchet results in an axial displacement of the ratchet between the first and second locked positions relative to the cover casing, thereby causing the gear driving member to displace between the first switch position and the second switch position.

The push plunger may comprise two opposite downward tabs each having a cam face on a bottom thereof. The ratchet may comprise a plurality of groove cuts and cam faces cooperating with the cam faces of the tabs whereby the ratchet tends to rotate. The groove cuts and the cam faces of the ratchet are formed circumferentially on an outer surface of the ratchet so as to alternately allow passage of at least one positioning block formed on an inner wall of the cover casing through one of the groove cuts to enable the ratchet to reach the first locked position and allow abutment of the at least one positioning block against one of the cam faces of the ratchet to enable the ratchet to reach the second locked position. The positioning block has a bottom cam face cooperating with the cam faces of the ratchet for facilitating the rotation of the ratchet. The gear driving member is coupled to the cover casing in such a manner that allows the rotation of the cover part to cause the gear driving member to rotate.

In a preferred embodiment of the present invention, an indicator mechanism may be provided in the cover part. The indicator mechanism comprises a hollow body accommodated in the push plunger and having two opposite axial slots; a flange atop the hollow body; and an indicator arranged on a top surface of the flange for indicating which compartment is in use. The ratchet may further comprise an upwardly extending portion extending from the cam faces of the ratchet and movably received in the hollow body, said upwardly extending portion has two opposite axial ribs which move to an upper portion of the respective axial slots when the ratchet is in the first locked position and move to a lower portion of the respective axial slots when the ratchet is in the second locked position, thereby creating a correspondence between the indicator and the compartment in use.

Preferably, the indicator is configured to have two regions of different colors indicative of the first and second compartments, respectively, and a cover plate with at least one transparent zone or at least one through hole is placed over the indicator in such a way that the transparent zone or the through hole is displaced in a rotatable direction between the two regions of the indicator depending on the compartment in use.

The first and second grinding mechanisms each may comprise a conical grinding wheel drivingly coupled to a first or a second shaft, and a grinding cylinder fixed to the respective compartment and accommodating the grinding wheel.

To have a better understanding of the invention reference is made to the following detailed description of the invention and embodiments thereof in conjunction with the accompanying drawings.

DETAILED DESCRIPTION OF THE INVENTION

While this invention is illustrated and described in preferred embodiments, the condiment mill of the present invention may be produced in many different configurations, sizes, forms and materials.

Figure 1:
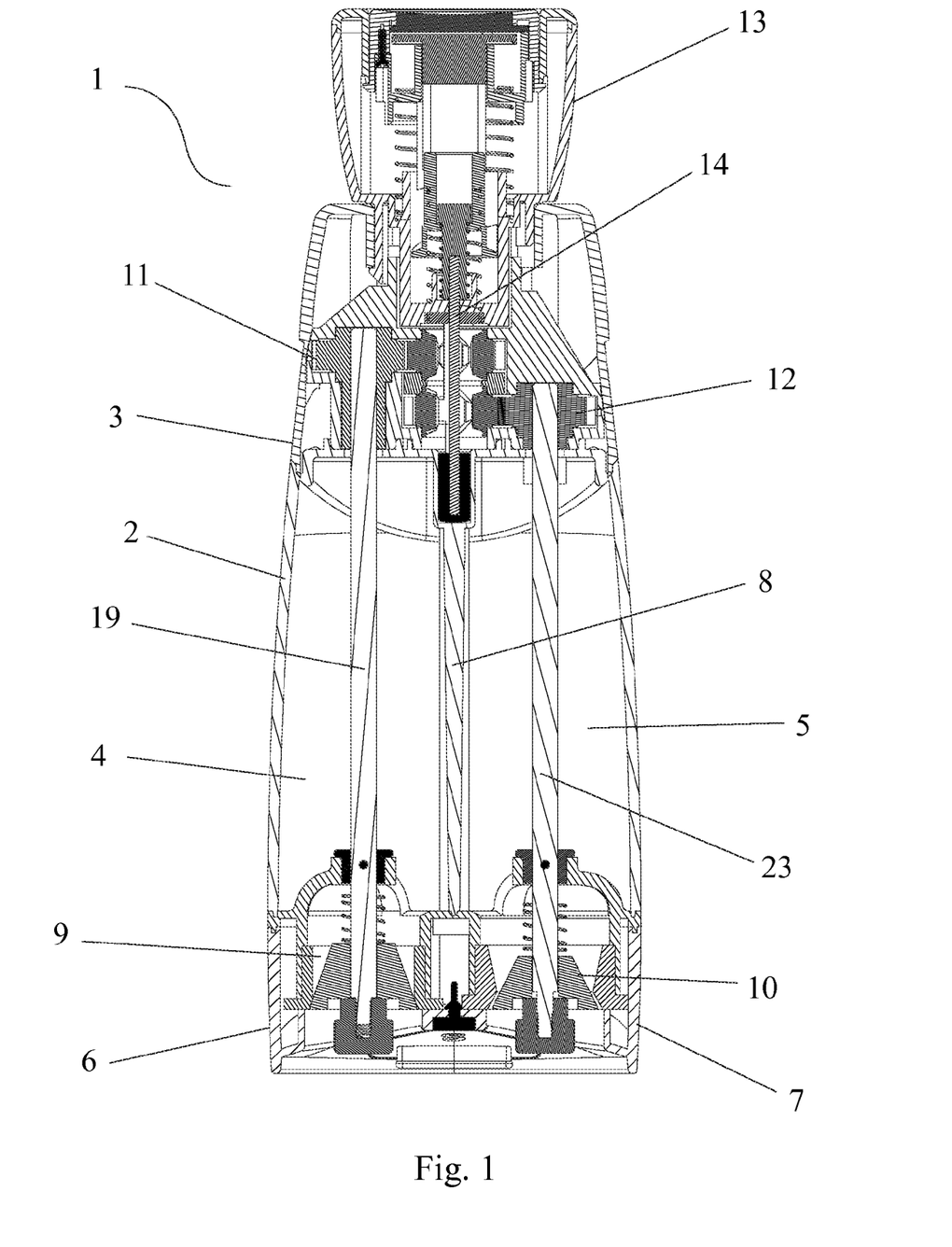
FIG. 1 is a cross sectional view of a condiment mill according to an embodiment of the present invention.

Referring now to the drawings, FIG. 1 illustrates in a cross sectional view a condiment mill according to a preferred embodiment of the present invention. The condiment mill 1 comprises a body part 2 and a cover part 13. The cover part 13 is positioned on top of the body part 2 and is configured to be rotatable in both clockwise and anti-clockwise directions relative to the body part 2. The body part 2 comprises a top end portion 3 which is positioned right below the cover part 13. Positioned below the top end portion 3 are a first compartment 4 and a second compartment 5 which are divided by a vertical divider wall 8. Two different condiments, such as salt and pepper, may be contained in the first and second compartments 4 and 5, respectively.

At the bottom of the first compartment 4, there is a bottom end portion 6, in which a first grinding mechanism 9 is arranged. The first grinding mechanism 9 is drivingly connected to a first gear mechanism 11 arranged in the top end portion 3 via a first shaft 19 extending through the first compartment 4. When the first gear mechanism 11 is rotated, either in clockwise or anti-clockwise direction, the first grinding mechanism 9 is driven to grind the condiment contained in the first compartment 4.

Similarly, the second compartment 5 comprises a bottom end portion 7 which contains a second grinding mechanism 10. The second grinding mechanism 10 is drivingly connected to a second gear mechanism 12 arranged in the top end portion 3 via a second shaft 23 extending through the second compartment 5. When the second gear mechanism 12 is rotated, either in clockwise or anti-clockwise direction, the second grinding mechanism 10 is driven to grind the condiment contained in the second compartment 5.

In order to enable the user to switch between the two different condiments contained in the first and second compartments 4 and 5 respectively, a gear driving member 14 is provided. The gear driving member 14 is a vertically extending rod rotatable around its longitudinal (that is, vertical)

axis by rotation of the cover part 13, and is vertically slidable between a first switch position and a second switch position. An actuator is provided to move the gear driving member 14 between the first and second switch positions and to lock the gear driving member 14 in the first switch position and the second switch position. When the gear driving member 14 is locked in the first switch position, rotation of the cover part 13 relative to the body part 2 in both clockwise and anti-clockwise directions drives the first gear mechanism 11 and consequently the first grinding mechanism 9, thus grinding the condiment contained in the first compartment 4. When the gear driving member 14 is locked in the second switch position, rotation of the cover part 13 relative to the body part 2 in both clockwise and anti-clockwise directions drives the second gear mechanism 12 and consequently the second grinding mechanism 10, thus grinding the condiment contained in the second compartment 5. Details of how the gear driving member 14 drives the gear mechanisms and the grinding mechanisms, as well as how the gear driving member 14 is moved between the first switch position and the second switch position by the actuator, will be explained hereinbelow.

Figure 2:
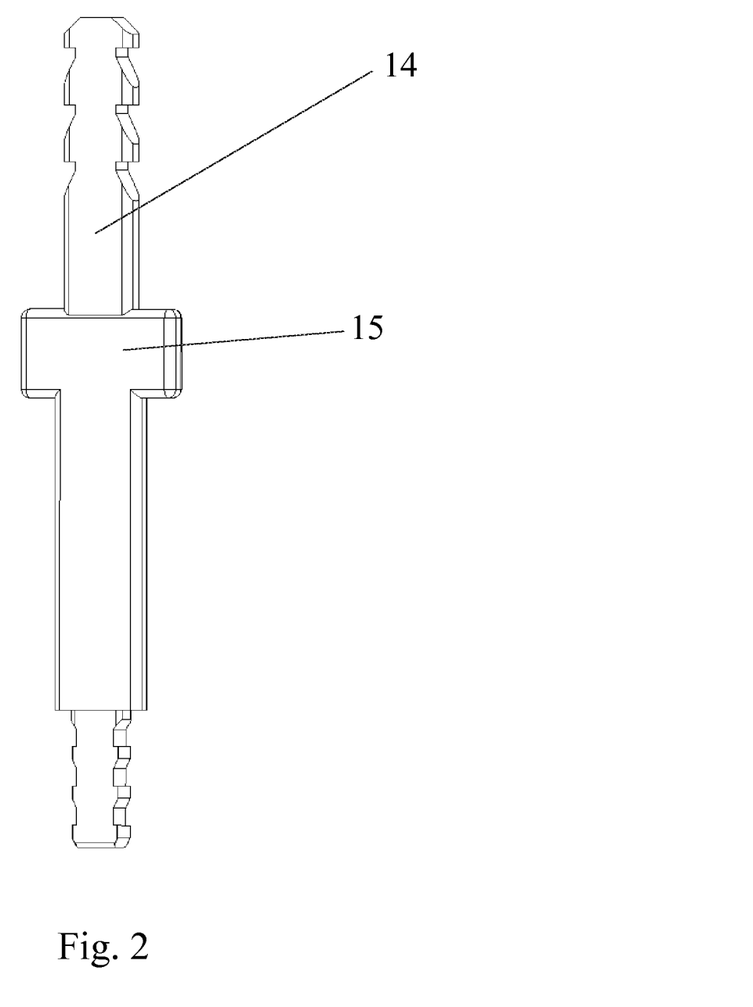
FIG. 2 is a perspective view of the gear driving member of the condiment mill shown in FIG. 1.
Figure 3:
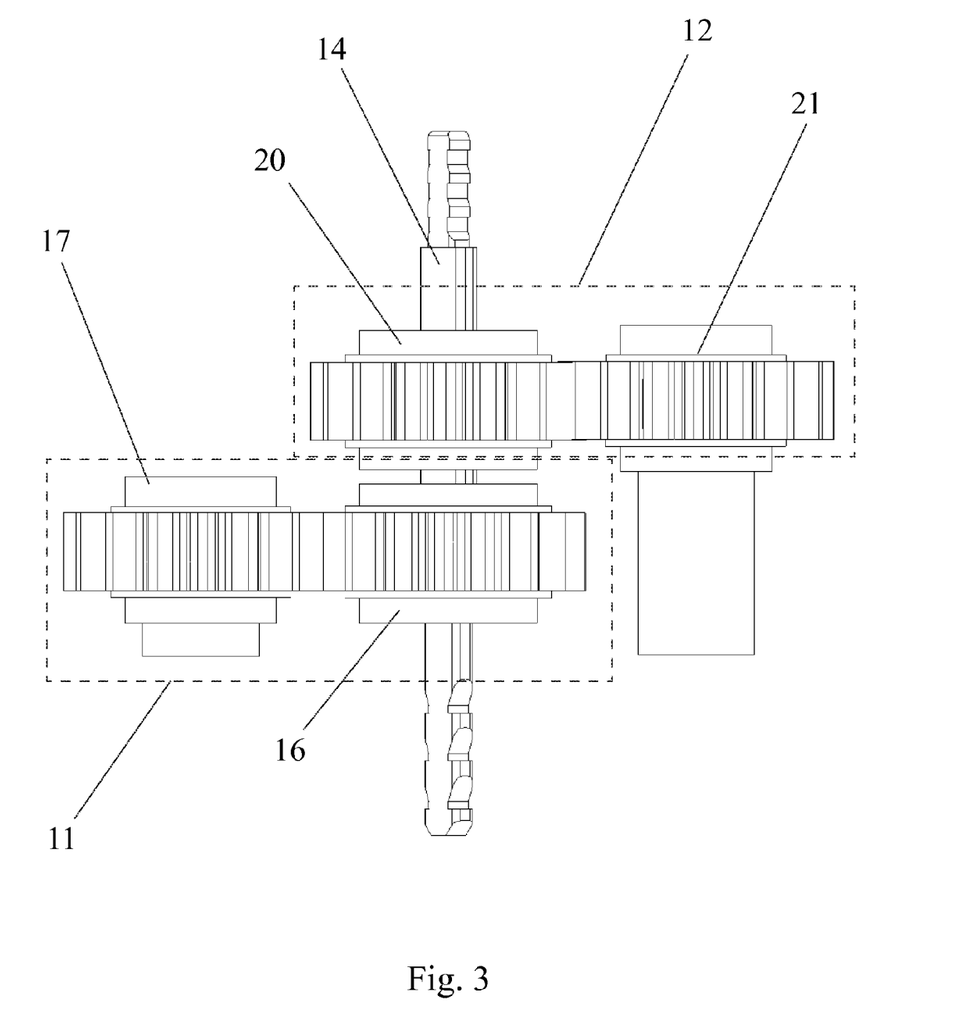
FIG. 3 is a perspective view of the gear driving member in cooperation with the first and second gear mechanisms according to the condiment mill shown in FIG. 1.
Figure 4:
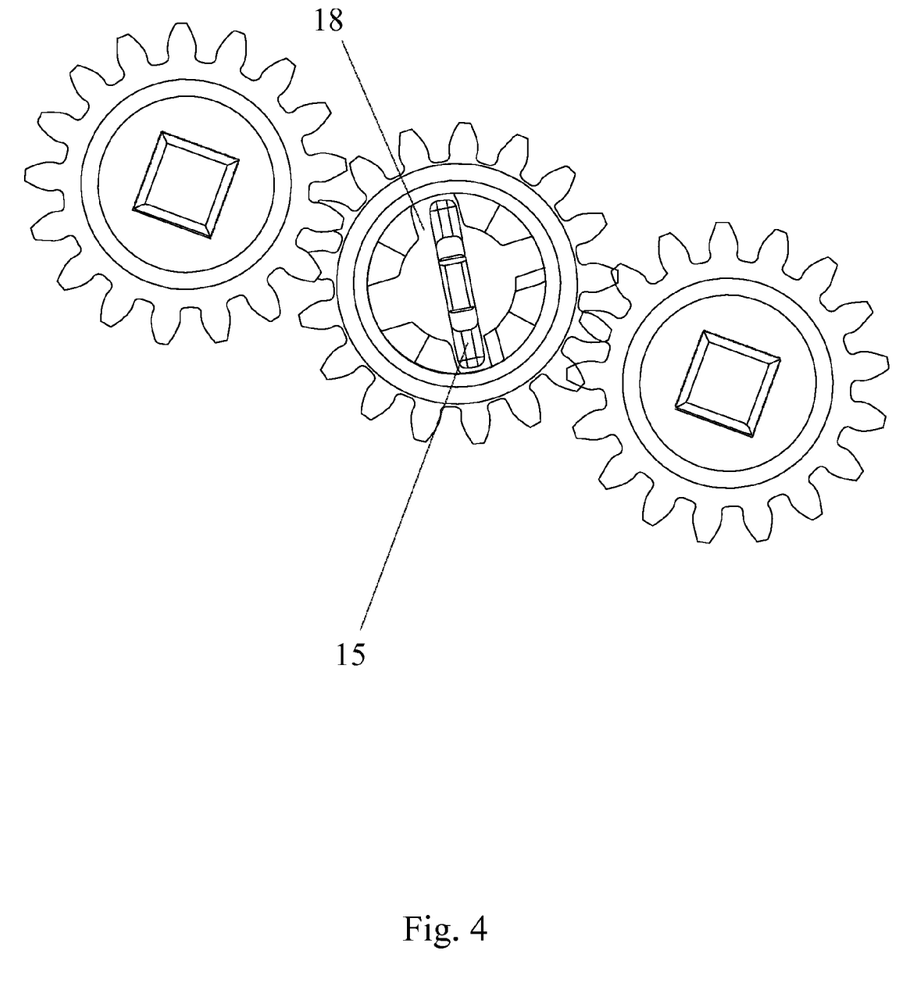
FIG. 4 is a bottom view of the gear driving member in cooperation with the first and second gear mechanisms shown in FIG. 3.
Figure 5:
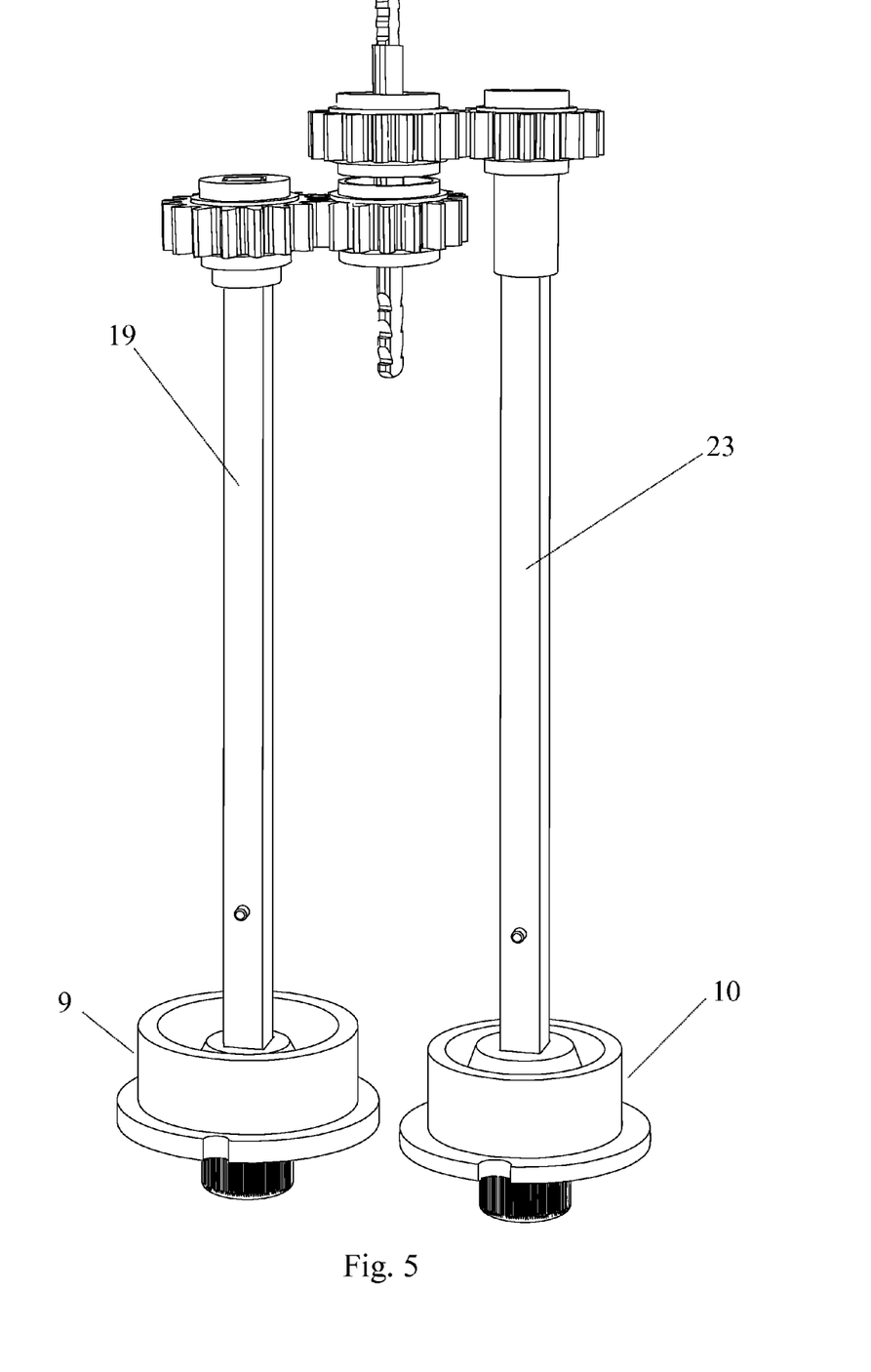
FIG. 5 is a perspective view of the gear driving member, the first and second gear mechanisms and the first and second grinding mechanisms which are in operative connection according to the condiment mill shown in FIG. 1.

Referring to FIGS. 2-5, there are illustrated the way how the gear driving member 14 drives the gear mechanisms and the grinding mechanisms. As shown in FIG. 2, the gear driving member 14 is a vertically extending rod having two protrusions 15 arranges at a same height and opposite to each other. A plurality of teeth are provided at the upper and lower portions of the gear driving member 14 to facilitate and enforce the connection of the gear driving member 14 to components located at the upper and lower portions thereof. As can be seen in FIGS. 3 and 4, the first gear mechanism 11 comprises a first gear wheel 16 and a third gear wheel 17. The first gear wheel 16 has a plurality of notches 18 formed on an inner surface thereof, and the third gear wheel 17 is at all times meshing with the first gear wheel 16. Similarly, the second gear mechanism 12 comprises a second gear wheel 20 and a fourth gear wheel 21. The second gear wheel 20 has a plurality of notches 22 formed on an inner surface thereof, and the fourth gear wheel 21 is at all times meshing with the second gear wheel 20. The first gear wheel 16 and the second gear wheel 20 are arranged coaxially, and the gear driving member 14 extends through both of them.

The gear driving member 14 is vertically slidable relative to both the first gear wheel 16 and the second gear wheel 20 between the first switch position and the second switch position. FIGS. 3 and 4 show the gear driving member 14 in the first switch position, wherein the two protrusions 15 of the gear driving member 14 cooperate with the notches 18 of the first gear wheel 16, such that rotation of the gear driving member 14 (either in clockwise or anti-clockwise direction), which is driven by rotation of the cover part 13, drives the first gear wheel 16, which drives the third gear wheel 17 and consequently the first grinding mechanism 9 (see FIG. 5). When the gear driving member 14 is in the second switch position (not shown), the two protrusions 15 cooperate with the notches 22 of the second gear wheel 20, such that rotation of the gear driving member 14 (either in clockwise or anti-clockwise direction), which is driven by rotation of the cover part 13, drives the second gear wheel 20, which drives the fourth gear wheel 21 and consequently the second grinding mechanism 10.

Referring to FIGS. 6-11, a mechanism for conveniently moving the gear driving member 14 between the first switch position and the second switch position, and consequently switching between the first and second compartments 4, 5 for the grinding operation, will now be explained in details.

In this preferred embodiment of the invention, the actuator for moving and locking the gear driving member is configured as a ballpoint pen ratchet mechanism which may be commonly known in the art. However, any other mechanism can be used as the actuator in order to move and lock the gear driving member 14.

Figures 9, 10:
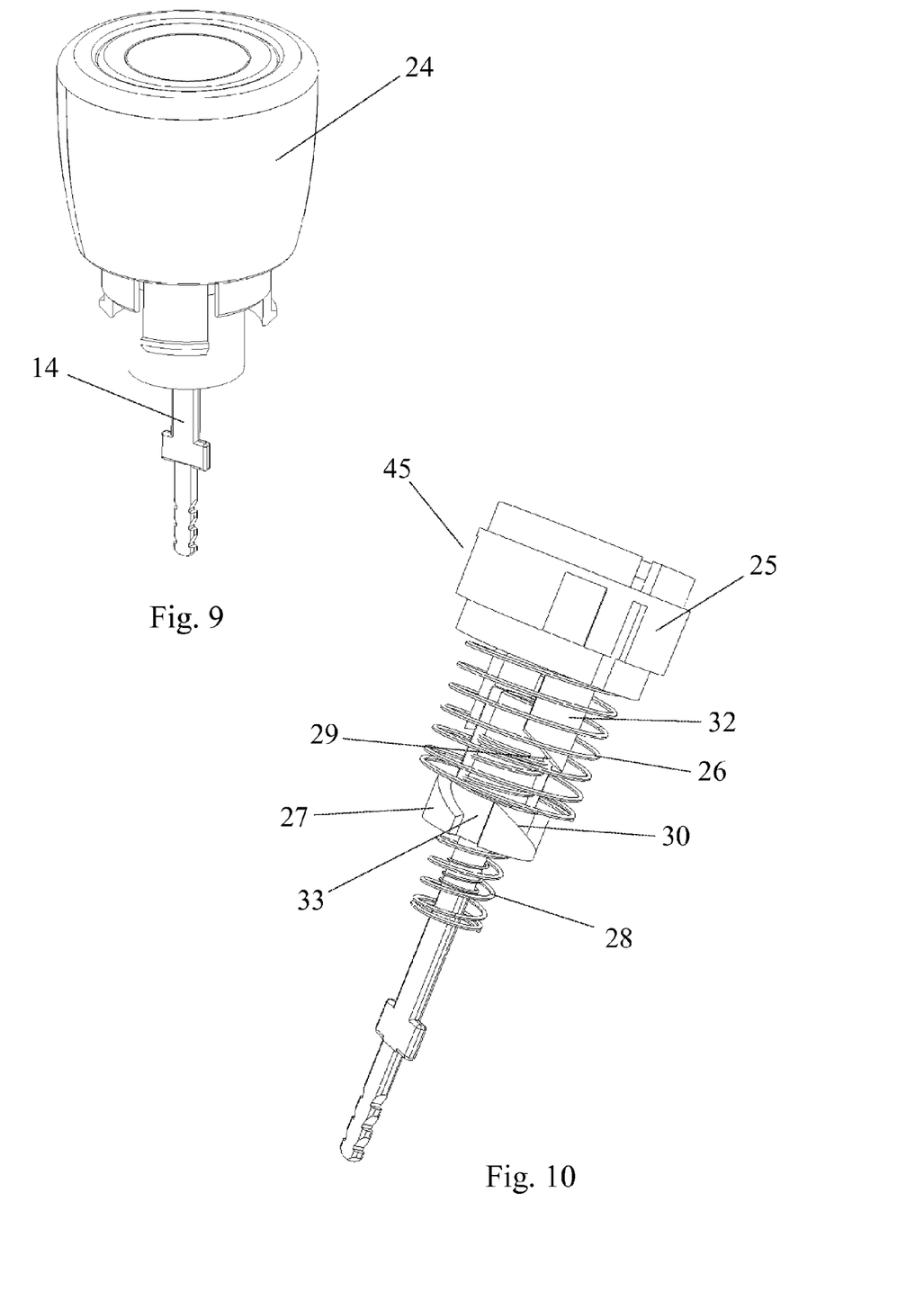
FIG. 9 is a perspective view of the cover casing coupled with the gear driving member according to the condiment mill shown in FIG. 1.
FIG. 10 is a perspective view of the ballpoint pen ratchet mechanism of the condiment mill shown in FIG. 1.

The cover part 13 comprises a cover casing 24 as shown in FIG. 9. The gear driving member 14 is coupled to the cover casing 24 in such a manner that rotation of the cover casing 24 causes the gear driving member 14 to rotate. The actuator 45 is received within the cover casing 24. The actuator 45 is configured to be axially movable relative to the cover casing 24. When the actuator 45 is pressed downwardly and then released, the gear driving member 14 is moved from the first switch position to the second switch position, or from the second switch position to the first switch position.

Figure 6:
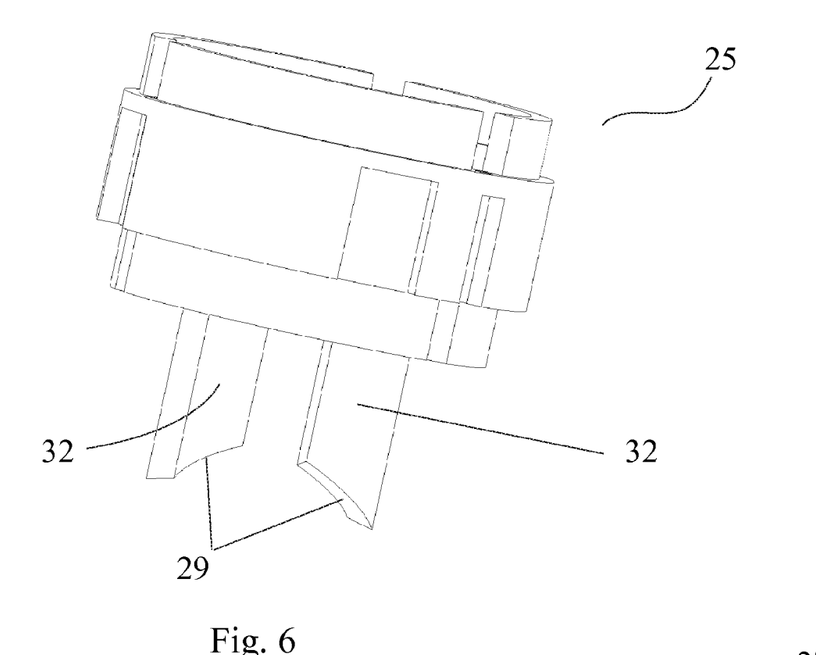
FIG. 6 is a perspective view of the push plunger of the condiment mill shown in FIG. 1.

As shown in FIG. 10, the actuator 45 comprises a push plunger 25, which is shown in FIG. 6 in more details. The push plunger 25 is non-rotatable but axially displaceable relative to the cover casing 24. The push plunger 25 is shaped as a hollow cylinder with two downwardly extending tabs 32 arranged opposite to each other on the circumference of the bottom of the hollow cylinder. Both the downwardly extending tabs 32 have respective bottom cam faces 29. A first spring 26 is provided to constantly apply an upward force to the push plunger 25 so that the push plunger 25 tends to move upward.

Figure 7:
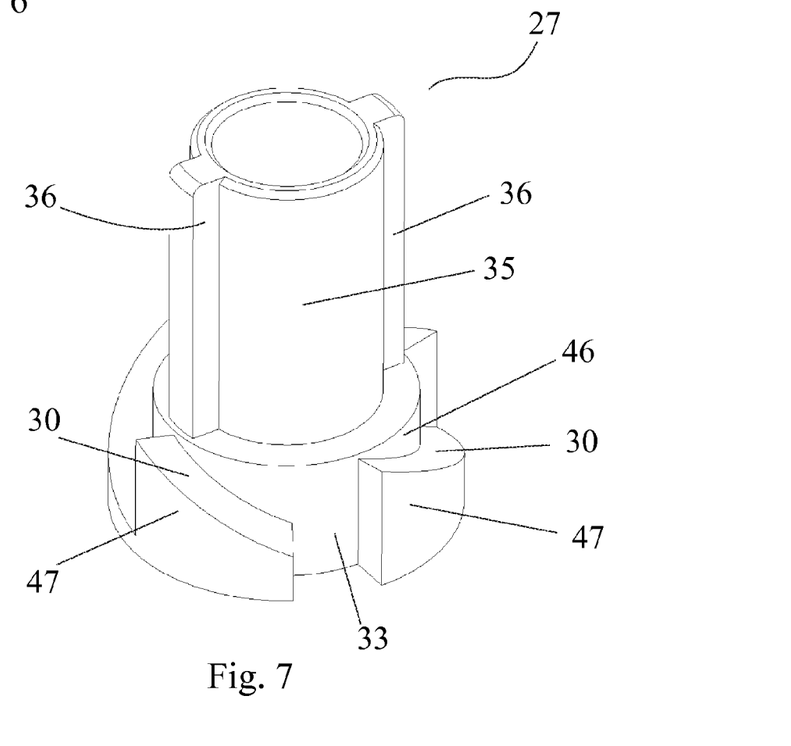
FIG. 7 is a perspective view of the ratchet of the condiment mill shown in FIG. 1.

The actuator 45 further comprises a ratchet 27 which is shown in FIG. 7 in more details and which is rotatable and axially displaceable relative to the cover casing 24. The ratchet 27 comprises a lower hollow cylindrical portion 46 and an upwardly extending portion 35, wherein the diameter of the lower hollow cylindrical portion 46 is larger than the diameter of the upwardly extending portion 35. Four radial protrusions 47 are circumferentially formed on an outer surface of the lower hollow cylindrical portion 46. Each of the protrusions 47 has a top cam face 30 which is configured to cooperate with the bottom cam faces 29 of the push plunger 25. Two groove cuts 33 opposite to each other are also formed on the same circumferential outer surface of the lower hollow cylindrical portion 46. As illustrated, the four protrusions 47 are divided into two groups by the two groove cuts 33, wherein the two protrusions in each group abut each other. A second spring 28 is provided to constantly apply an upward force to the ratchet 27 so that the ratchet 27 tends to move upward.

The gear driving member 14 is coupled to the ratchet 27 in such a manner that they are rotatable but axially non-displaceable relative to each other.

Figure 8A:
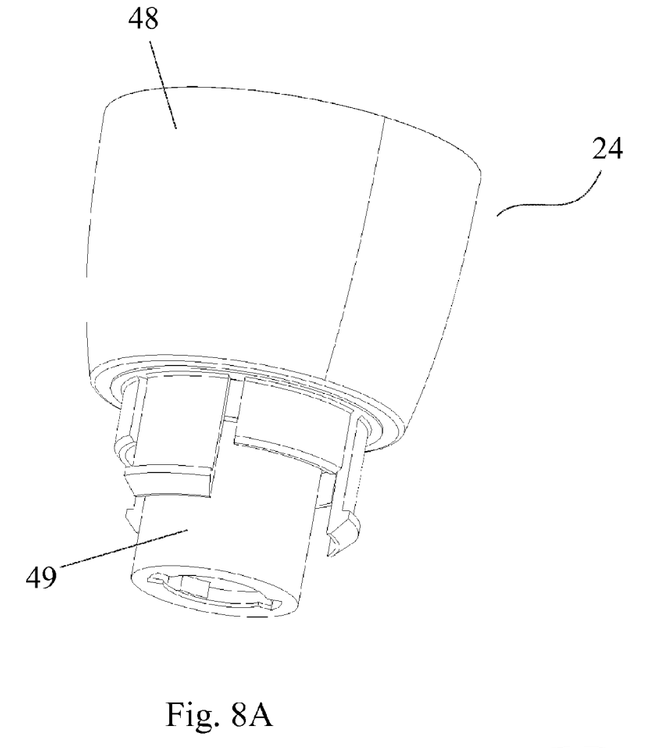
FIG. 8A is a front perspective view of the cover casing of the condiment mill shown in FIG. 1.
Figure 8B:
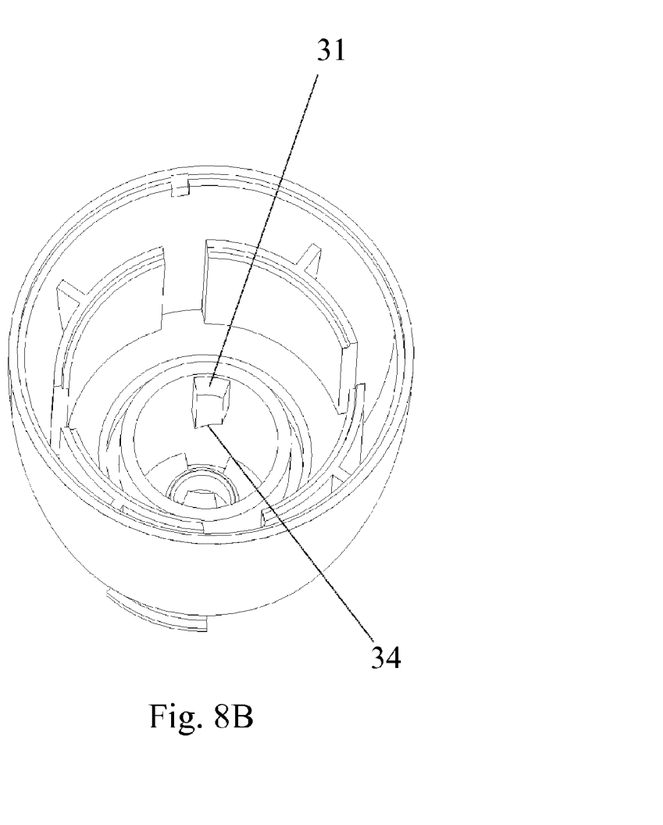
FIG. 8B is a top perspective view of the cover casing shown in FIG. 8A at an angle.
Figure 8C:
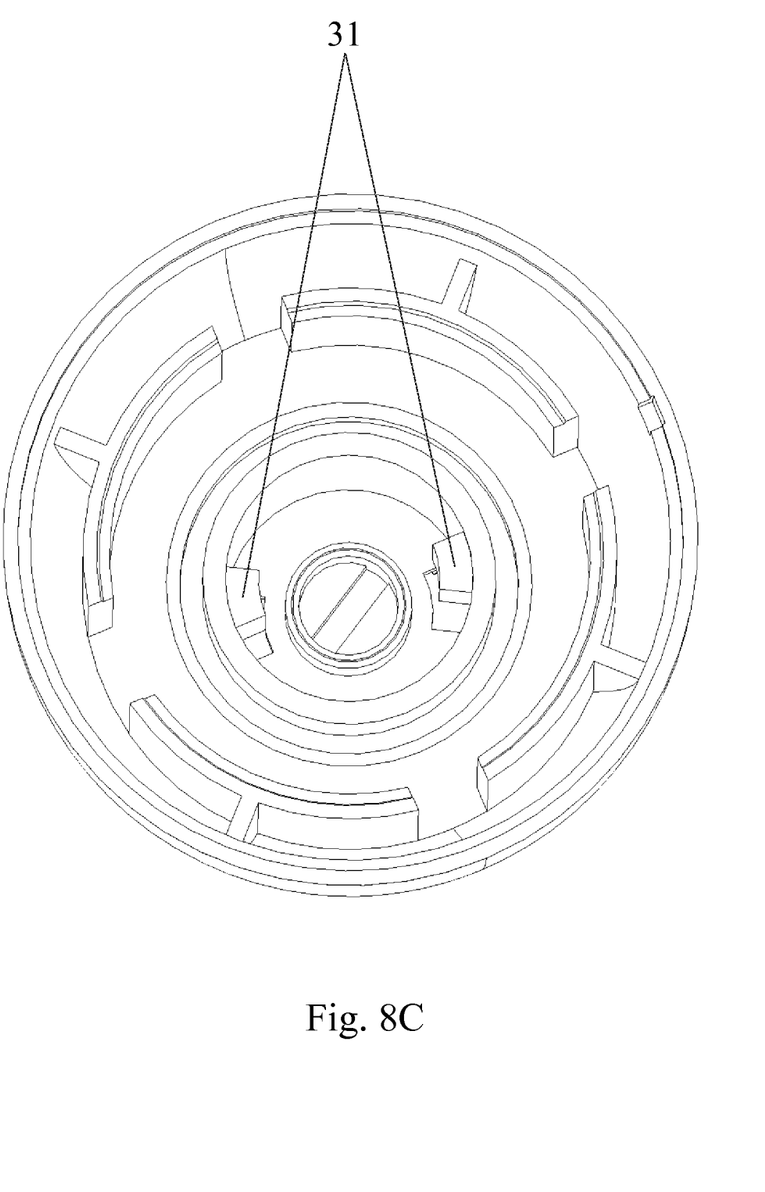
FIG. 8C is a top perspective view of the cover casing shown in FIG. 8A at another angle.

Due to the cooperating cam faces 29 and 30 of the push plunger 25 and the ratchet 27, when the push plunger 25 is forced downwardly against the ratchet 27, the ratchet 27 tends to rotate in the clockwise direction when viewed from the top. In addition, a pair of positioning blocks 31 are formed on an inner wall of the cover casing 24 to hold the ratchet selectively in one of two axially spaced positions (i.e. the first and second switch positions) depending on the angle of rotation of the ratchet 27. As shown in FIG. 8A, the cover casing 24 comprises an upper hollow portion 48 in substantially cylindrical shape and a lower hollow cylindrical portion 49, wherein the diameter of the upper hollow portion 48 is larger than the diameter of the lower hollow cylindrical portion 49, and a top end of the lower hollow cylindrical portion 49 extends into the upper hollow portion 48. As shown in FIGS. 8B and 8C, the positioning blocks 31 are a pair of radial projections formed opposite to each other on an inner wall of the lower cylindrical portion 49. The width of the positioning blocks 31 is smaller than the width of the groove cuts 33 of the ratchet 27. Each of the positioning blocks 31 has a bottom cam face 34 which cooperates with one of the four cam faces 30 of the ratchet 27. Therefore, when the cam faces 30 are forced against the cam faces 34, the ratchet 27 again tends to rotate in the clockwise direction when viewed from the top.

Thus, to move the gear driving member 14 between the first and second switch positions, the push plunger 25 is first pressed (for example, by a finger of a user) downwardly against the ratchet 27, causing the ratchet 27 to rotate in the clockwise direction when viewed from the top and the ratchet 27 to move downwardly. Then the downward pressure applied on the push plunger is removed (for example, by removing the finger of the user), and both the push plunger 25 and the ratchet 27 are forced to move upwardly by the first spring 26 and the second spring 28, respectively. As the ratchet 27 moves upwardly, the cam faces 30 thereof come into contact with the bottom cam faces 34 of the positioning blocks 31, causing the ratchet 27 to rotate further in the clockwise direction when viewed from the top. Depending on the angle of rotation of the ratchet 27, if the two positioning blocks 31 are in alignment with the two groove cuts 33, and the positioning blocks 31 slide through the groove cuts 33, then the ratchet 27 is allowed to move upwardly to a higher position, namely a second locked position corresponding to the second switch position of the gear driving member 14; if the two positioning blocks 31 are in a position between the two abutted protrusions 47 of a same group of the ratchet 27, the positioning blocks 31 abut the cam faces 30 of the ratchet 27, or in other words, rest between the two abutted protrusions 47, and therefore the ratchet 27 is prevented from further moving upwardly and is locked in a first locked position, corresponding to the first switch position of the gear driving member 14. When the push plunger 25 is pressed downwardly and then released again, the above described process occurs again, moving the ratchet 27 between the first and second locked positions, and consequently the gear driving member 14 between the first and second switch positions. In other words, every time the push plunger 25 is pressed downwardly and then released, the ratchet 27, and consequently the gear driving member 14, is selectively and alternately held in one of two axially spaced positions, which enables to select one of the two separated condiments for the grinding operation.

Figure 11:
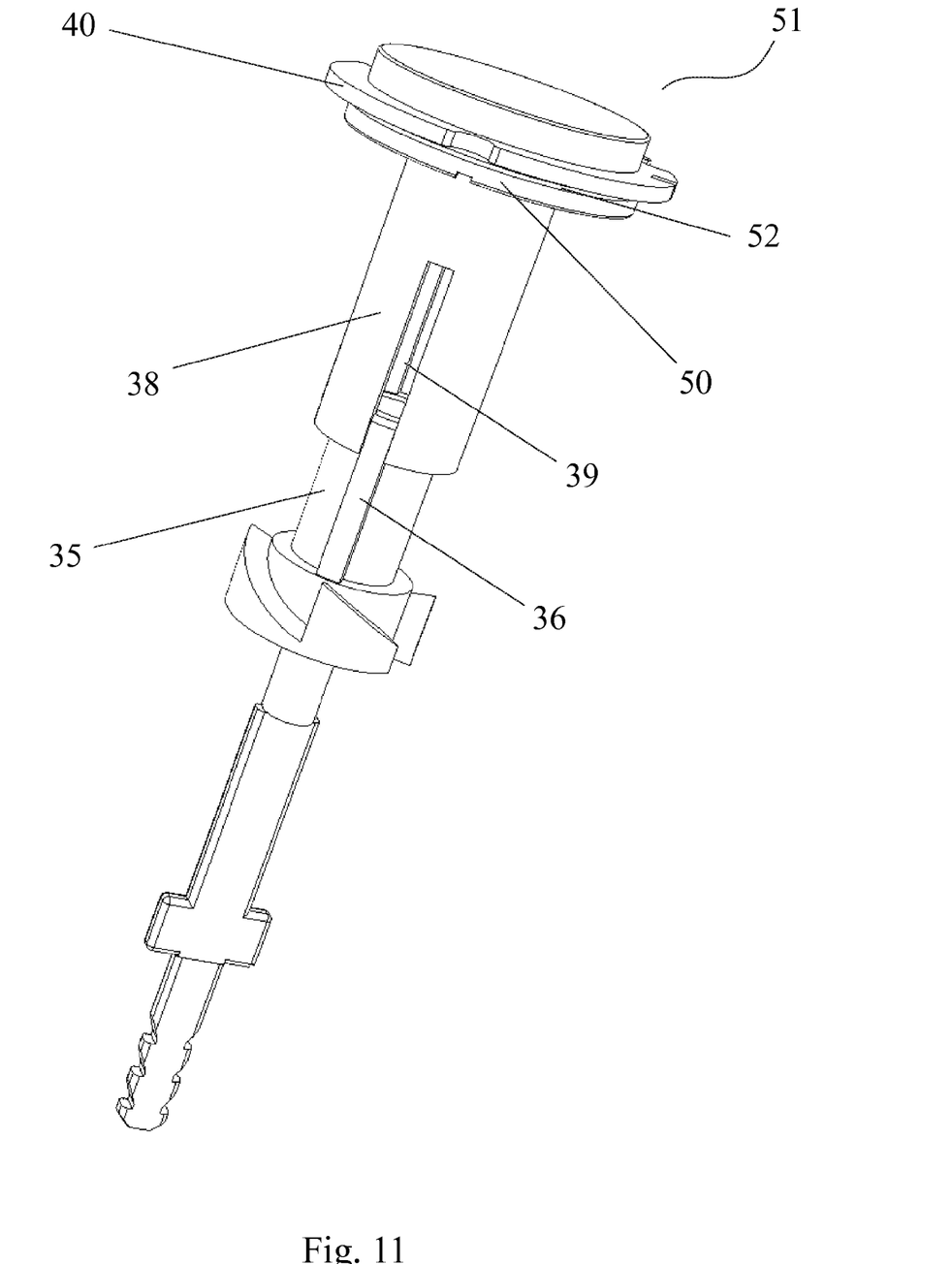
FIG. 11 is a perspective view of the indicator mechanism of the condiment mill shown in FIG. 1.
Figure 12A:
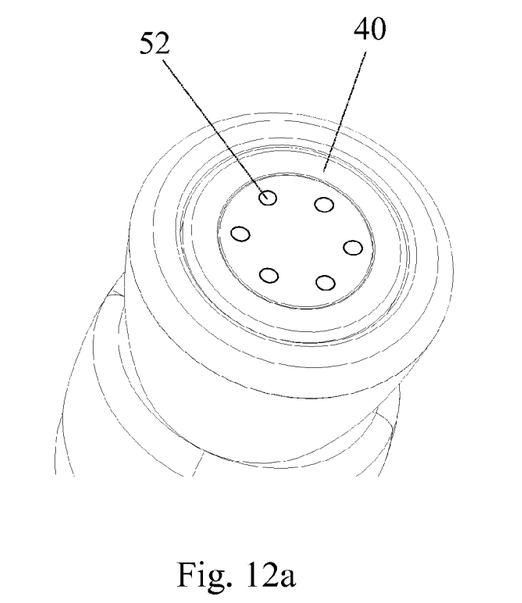
FIG. 12A is a top perspective view of the indicator mechanism shown in FIG. 11 indicating one of the condiments.
Figure 12B:
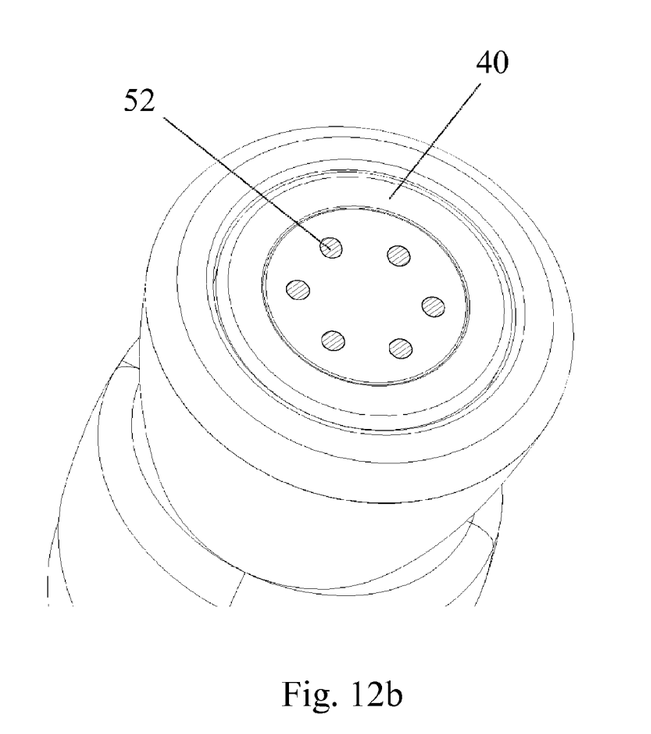
FIG. 12B is a top perspective view of the indicator mechanism shown, in FIG. 11 indicating the other of the condiments.
Figure 13:
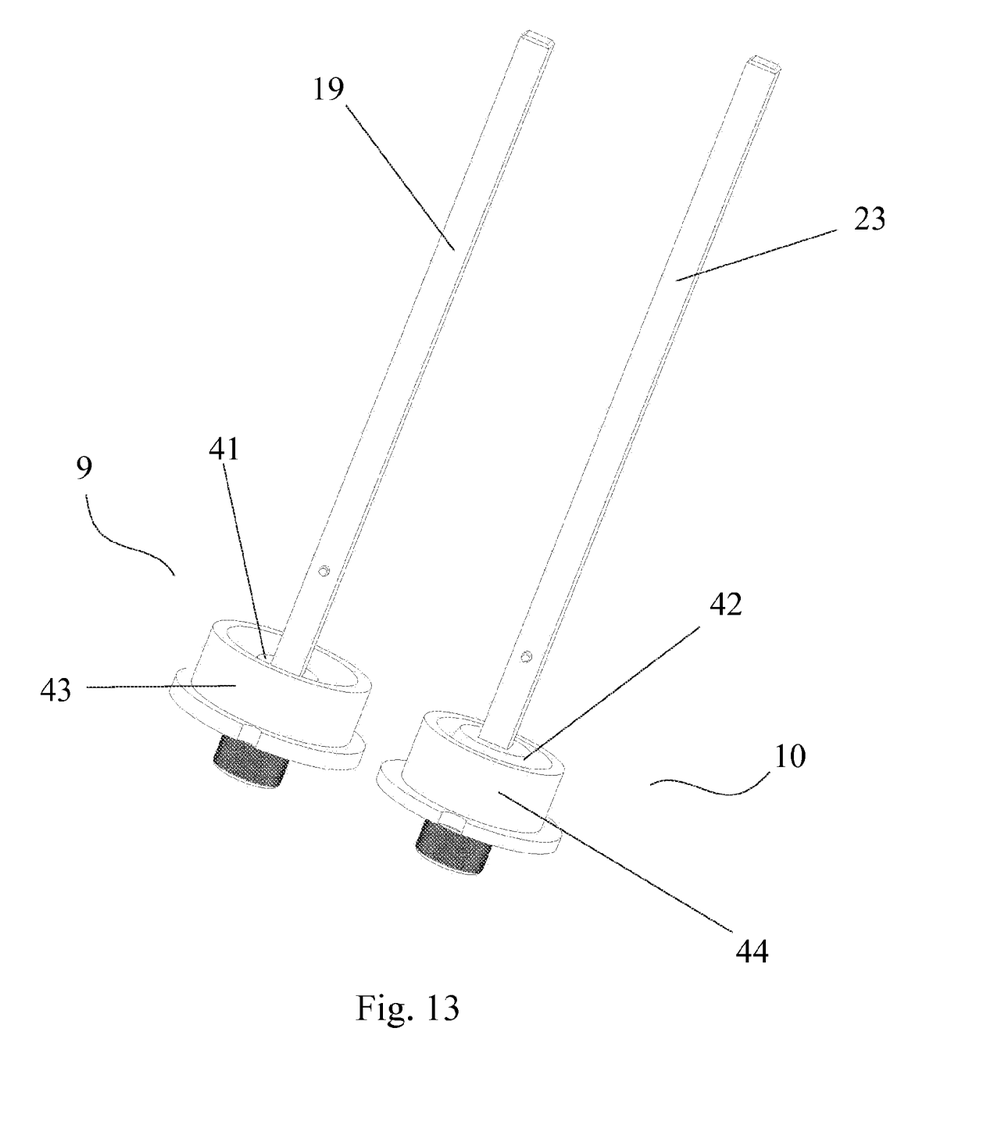
FIG. 13 is a perspective view of the grinding mechanisms of the condiment mill shown in FIG. 1.

To clearly indicate the condiment being ground so as to prevent misoperation, the condiment mill of the present invention further comprises an indicator mechanism 51, which is illustrated in FIGS. 12 and 13. The indicator mechanism 51 comprises a hollow cylindrical body 38 accommodated in the push plunger 25, a flange 50 atop the hollow cylindrical body 38, and an indicator 52 arranged on a top surface of the flange 50 for indicating which compartment is in use. Two axial slots 39 are formed opposite to each other on the wall of the hollow cylindrical body 38. Correspondingly, two axially extending ribs 36 are formed opposite to each other on an outer surface of the upwardly extending portion 35 of the ratchet 27. The inner diameter of the hollow cylindrical body 38 is slightly larger than the outer diameter of the upwardly extending portion 35 of the ratchet 27, such that the upwardly extending portion 35 is able to slide and be received within the hollow cylindrical body 38, with the axially extending ribs 36 being received and slidable within the axial slots 39. Therefore, the hollow cylindrical body 38 is non-rotatable but axially displaceable relative to the ratchet 27. In other words, when the ratchet 27 rotates around its longitudinal axis, the hollow cylindrical body 38 rotates together with the ratchet 27, creating a correspondence between the indicator 52 and the compartment in use. The axial ribs 36 move to an upper portion of the respective axial slots when the ratchet 27 is in the first locked position and move to a lower portion of the respective axial slots when the ratchet 27 is in the second locked position.

The indicator mechanism 51 further comprises a cover plate 40 which is placed on top of the indicator 52. The cover plate 40 is rotatable relative to the hollow cylindrical body 38 and relative to the cover casing 24, suggesting the cover plate 40 would not rotate with the hollow cylindrical body 38 and the cover casing 24.

As shown in FIGS. 12A and 12B, the cover plate 40 has at least one transparent zone or through hole, and the indicator 52 is configured to have two regions of different colors indicative of the first and second compartments, respectively, such that one of the two colors is selectively and alternately displayed through the at least one transparent zone or through hole of the cover plate 40 depending on the angle of rotation of the ratchet 27.

As shown in FIG. 13, the grinding mechanisms 9 and 10 are conventionally constructed. Each of the grinding mechanisms 9 and 10 comprises a conical grinding wheel 41 and 42 coupled to the first and second shaft 19 and 23 respectively, in such a manner that the grinding wheels 41 and 42 are driven in rotation by the respective shaft 19 and 23. Each of the grinding mechanisms 9 and 10 further comprises a grinding cylinder 43 and 44 which is fixed to the body part 2 and which accommodates the respective grinding wheel 41 and 42. In operation, the grinding wheels 41 and 42 serve as the rotor, while the grinding cylinders 43 and 44 serve as the stator, such that the condiments are ground between the grinding wheels and the respective grinding cylinders.

While the present invention is described in connection with what is presently considered to be the most practical and preferred embodiment, it should be appreciated that the invention is not limited to the disclosed embodiment, and is intended to cover various modifications and equivalent arrangements included within the spirit and scope of the claims. Modifications and variations in the present invention may be made without departing from the novel aspects of the invention as defined in the claims, and this application is limited only by the scope of the claims.

NUMERICAL REFERENCES 1 condiment mill
2 body part
3 top end portion
4 first compartment
5 second compartment
6 bottom end portion of the first compartment
7 bottom end portion of the second compartment
8 divider wall
9 first grinding mechanism
10 second grinding mechanism
11 first gear mechanism
12 second gear mechanism
13 cover part
14 gear driving member
15 protrusion
16 first gear wheel
17 third gear wheel
18 notch
19 first shaft 20 second gear wheel
21 fourth gear wheel
22 notch
23 second shaft
24 cover casing
25 push plunger
26 first spring
27 ratchet
28 second spring
29 cam face of the push plunger
30 cam face of the ratchet
31 positioning block
32 downward tab
33 groove cut
34 cam face of the positioning block
35 upwardly extending portion
36 axial rib
38 hollow body
39 axial slot
40 cover plate
41 grinding wheel
42 grinding wheel
43 grinding cylinder
44 grinding cylinder
45 actuator
46 lower hollow cylindrical portion
47 protrusion
48 upper hollow portion
49 lower hollow cylindrical portion
50 flange
51 indicator mechanism
52 indicator

What is claimed is:

1. A condiment mill (1) comprising:
a body part (2) comprising a top end portion (3), first and second compartments (4, 5) below the top end portion and having respective bottom end portions (6, 7), and a vertical divider wall (8) between the compartments, each of said compartments for containing a separate condiment to be ground;
first and second grinding mechanism (9, 10) arranged in the bottom end portions of the first and second compartments respectively;
first and second gear mechanism (11, 12) drivingly connected to the first and second grinding mechanism respectively and arranged in the top end portion (3) of the body part;
a cover part (13) detachably and rotatably placed over a top of the body part (2);
a gear driving member (14) movable between a first switch position wherein the gear driving member engages with the first gear mechanism and rotates in both clockwise and anti-clockwise directions to drive the first gear mechanism which, in turn, activates the first grinding mechanism (9), and a second switch position wherein the gear driving member engages with the second gear mechanism and rotates in both clockwise and anti-clockwise directions to drive the second gear mechanism which, in turn, activates the second grinding mechanism (9); the gear driving member being configured such that rotation of the cover part in both clockwise and anti-clockwise directions causes the rotation of the gear driving member in the first and second switch position; and
an actuator in operative connection with the gear driving member to move the gear driving member between the first switch position and the second switch position.

2. The condiment mill of claim 1, wherein
the first gear mechanism (11) comprises a first gear wheel (16) engagable with the gear driving member (14) in the first switch position thereof, and a third gear wheel (17) meshing with the first gear wheel (16) and drivingly connected to the first grinding mechanism (9) via a first shaft (19); and
the second gear mechanism (12) comprises a second gear wheel (20) engagable with the gear driving member (14) in the second switch position thereof, and a fourth gear wheel (21) meshing with the second gear wheel (20) and drivingly connected to the second grinding mechanism (10) via a second shaft (23).

3. The condiment mill of claim 2, wherein each of the first and second gear wheel (15, 20) is formed with at least two opposite notches on an inner surface thereof, which notches are engagable with two protrusions projecting from two opposite sides of the gear driving member.

4. The condiment mill of claim 1, wherein the actuator is configured as a ballpoint pen ratchet mechanism which is alternately latched in a first locked position or a second locked position, so that the first or the second locked position of the ballpoint pen ratchet mechanism is respectively correspondent to the first or the second switch position of the gear driving member (14).

5. The condiment mill of claim 4, wherein the ballpoint pen ratchet mechanism comprises:
a push plunger (25) connected to a first spring (26) which is forced to move the push plunger upward, and
a ratchet (27) configured to rotate when the push plunger is pressed against the ratchet, the ratchet (27) being connected to a second spring (28) which is forced to move the ratchet upward and connected to the gear driving member (14),
wherein the push plunger (25) and the ratchet (27) are disposed inside a cover casing (24) of the cover part in such a way that the rotation of the ratchet (27) results in an axial displacement of the ratchet between the first and second locked positions relative to the cover casing (24), thereby causing the gear driving member (14) to displace between the first switch position and the second switch position.

6. The condiment mill of claim 5, wherein the push plunger (25) comprises two opposite downward tabs (32) each having a cam face (29) on a bottom thereof; and the ratchet (27) comprises a plurality of groove cuts (33) and cam faces (30) cooperating with the cam faces (29) of the tabs whereby the ratchet (27) tends to rotate, wherein the groove cuts (33) and the cam faces (30) of the ratchet (25) are formed circumferentially on an outer surface of the ratchet (27) so as to alternately allow passage of at least one positioning block (31) formed on an inner wall of the cover casing (24) through one of the groove cuts to enable the ratchet (27) to reach the first locked position and allow abutment of the at least one positioning block (31) against one of the cam faces of the ratchet to enable the ratchet to reach the second locked position.

7. The condiment mill of claim 6, wherein the positioning block (31) has a bottom cam face (34) cooperating with the cam faces (30) of the ratchet (27) for facilitating the rotation of the ratchet (27).

8. The condiment mill of claim 5, wherein the gear driving member is coupled to the cover casing (24) in such a manner that allows the rotation of the cover part to cause the gear driving member to rotate.

9. The condiment mill of claim 5, wherein an indicator mechanism (52) is provided in the cover part (13), the indicator mechanism (52) comprises:
a hollow body (38) accommodated in the push plunger (25) and having two opposite axial slots (39),
a flange (50) atop the hollow body, and
an indicator (52) arranged on a top surface of the flange for indicating which compartment is in use, and
wherein the ratchet (27) further comprises an upwardly extending portion (35) extending from the cam faces of the ratchet and movably received in the hollow body (38), said upwardly extending portion has two opposite axial ribs (36) which move to an upper portion of the respective axial slots when the ratchet (27) is in the first locked position and move to a lower portion of the respective axial slots when the ratchet (27) is in the second locked position, thereby creating a correspondence between the indicator and the compartment in use.

10. The condiment mill of claim 9, wherein the indicator is configured to have two regions of different colors indicative of the first and second compartments, respectively; and a cover plate (40) with at least one transparent zone or at least one through hole is placed over the indicator in such a way that the transparent zone or the through hole is displaced in a rotatable direction between the two regions of the indicator depending on the compartment in use.

11. The condiment mill of claim 1, wherein the gear driving member (14) is configured as a rod.

12. The condiment mill of claim 1, wherein the first and second grinding mechanisms (9, 10) each comprises:
a conical grinding wheel (41, 42) drivingly coupled to a first or a second shaft (19, 23), and
a grinding cylinder (43, 44) fixed to the respective compartment (4, 5) and accommodating the grinding wheel.

13. A condiment mill (1) comprising:
a body part (2) comprising a top end portion (3), first and second compartments (4, 5) below the top end portion and having respective bottom end portions (6, 7), and a vertical divider wall (8) between the compartments, each of said compartments for containing a separate condiment to be ground;
first and second grinding mechanism (9, 10) arranged in the bottom end portions of the first and second compartments respectively;
first and second gear mechanism (11, 12) drivingly connected to the first and second grinding mechanism respectively and arranged in the top end portion (3) of the body part;
a cover part (13) detachably and rotatably placed over a top of the body part (2);
a gear driving member (14) movable between a first switch position wherein the gear driving member engages with the first gear mechanism and rotates to drive the first gear mechanism which, in turn, activates the first grinding mechanism (9), and a second switch position wherein the gear driving member engages with the second gear mechanism and rotates to drive the second gear mechanism which, in turn, activates the second grinding mechanism (9); the gear driving member being configured such that rotation of the cover part causes the rotation of the gear driving member in the first and second switch position; and
an actuator in operative connection with the gear driving member to move the gear driving member between the first switch position and the second switch position;
wherein the first gear mechanism (11) comprises a first gear wheel (16) engagable with the gear driving member (14) in the first switch position thereof, and a third gear wheel (17) meshing with the first gear wheel (16) and drivingly connected to the first grinding mechanism (9) via a first shaft (19); and
the second gear mechanism (12) comprises a second gear wheel (20) engagable with the gear driving member (14) in the second switch position thereof, and a fourth gear wheel (21) meshing with the second gear wheel (20) and drivingly connected to the second grinding mechanism (10) via a second shaft (23);
wherein each of the first and second gear wheel (15, 20) is formed with at least two opposite notches on an inner surface thereof, which notches are engagable with two protrusions projecting from two opposite sides of the gear driving member.

14. The condiment mill of claim 13, wherein the actuator is configured as a ballpoint pen ratchet mechanism which is alternately latched in a first locked position or a second locked position, so that the first or the second locked position of the ballpoint pen ratchet mechanism is respectively correspondent to the first or the second switch position of the gear driving member (14).

15. The condiment mill of claim 14, wherein the ballpoint pen ratchet mechanism comprises:
a push plunger (25) connected to a first spring (26) which is forced to move the push plunger upward, and
a ratchet (27) configured to rotate when the push plunger is pressed against the ratchet, the ratchet (27) being connected to a second spring (28) which is forced to move the ratchet upward and connected to the gear driving member (14),
wherein the push plunger (25) and the ratchet (27) are disposed inside a cover casing (24) of the cover part in such a way that the rotation of the ratchet (27) results in an axial displacement of the ratchet between the first and second locked positions relative to the cover casing (24), thereby causing the gear driving member (14) to displace between the first switch position and the second switch position.

16. The condiment mill of claim 15, wherein the push plunger (25) comprises two opposite downward tabs (32) each having a cam face (29) on a bottom thereof; and the ratchet (27) comprises a plurality of groove cuts (33) and cam faces (30) cooperating with the cam faces (29) of the tabs whereby the ratchet (27) tends to rotate, wherein the groove cuts (33) and the cam faces (30) of the ratchet (25) are formed circumferentially on an outer surface of the ratchet (27) so as to alternately allow passage of at least one positioning block (31) formed on an inner wall of the cover casing (24) through one of the groove cuts to enable the ratchet (27) to reach the first locked position and allow abutment of the at least one positioning block (31) against one of the cam faces of the ratchet to enable the ratchet to reach the second locked position.

17. The condiment mill of claim 16, wherein the positioning block (31) has a bottom cam face (34) cooperating with the cam faces (30) of the ratchet (27) for facilitating the rotation of the ratchet (27).

18. The condiment mill of claim 15, wherein the gear driving member is coupled to the cover casing (24) in such a manner that allows the rotation of the cover part to cause the gear driving member to rotate.

19. The condiment mill of claim 15, wherein an indicator mechanism (52) is provided in the cover part (13), the indicator mechanism (52) comprises:

a hollow body (38) accommodated in the push plunger (25) and having two opposite axial slots (39), a flange (50) atop the hollow body, and an indicator (52) arranged on a top surface of the flange for indicating which compartment is in use, and wherein the ratchet (27) further comprises an upwardly extending portion (35) extending from the cam faces of the ratchet and movably received in the hollow body (38), said upwardly extending portion has two opposite axial ribs (36) which move to an upper portion of the respective axial slots when the ratchet (27) is in the first locked position and move to a lower portion of the respective axial slots when the ratchet (27) is in the second locked position, thereby creating a correspondence between the indicator and the compartment in use.

20. The condiment mill of claim 19, wherein the indicator is configured to have two regions of different colors indicative of the first and second compartments, respectively; and a cover plate (40) with at least one transparent zone or at least one through hole is placed over the indicator in such a way that the transparent zone or the through hole is displaced in a rotatable direction between the two regions of the indicator depending on the compartment in use.

\* \* \* \* \*